Sept. 19, 1950 V. A. HOOVER 2,522,675
VENTILATING MEANS FOR ELECTRIC MOTORS
Filed Sept. 15, 1948
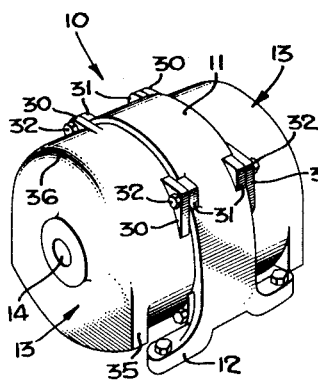
Fig. 1.
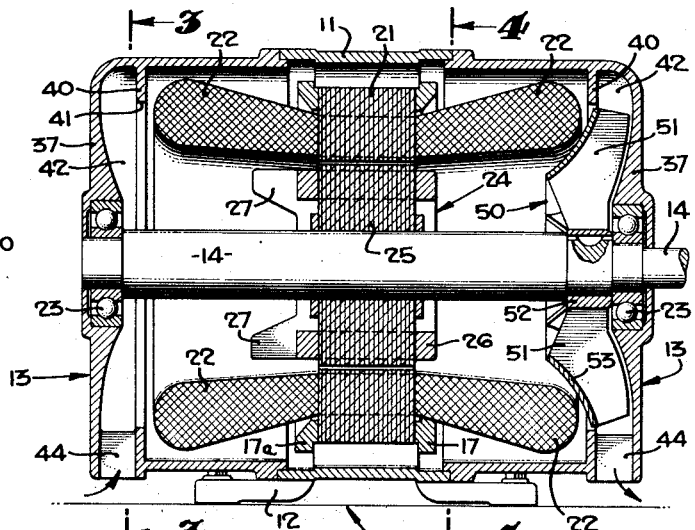
Fig. 2.
Fig. 3.
Fig. 4.
Fig. 5.
VAINO A. HOOVER,
INVENTOR.
BY
Robert O. Fulwider
ATTORNEY Patented Sept. 19, 1950

2,522,675

UNITED STATES PATENT OFFICE 2,522,675

VENTILATING MEANS FOR ELECTRIC MOTORS

Vaino A. Hoover, Los Angeles, Calif.

Application September 15, 1948, Serial No. 49,385

5 Claims. (Cl. 172—36)

My invention relates generally to electric motors and more particularly to an improved means for cooling such motors by passing an airstream therethrough.

It is well known that the heating of an electric motor during use largely determines the capacity of that motor. For example, where a motor is used relatively infrequently and for short periods of time, as in the case of certain aircraft motors, a rather small motor may be used to do a large amount of work, though the motor will be considerably heated during this process. However, because of the small percentage of the time it is used, the motor will have ample opportunity to cool before being used again. If this same motor were operated continuously, its capacity under such conditions would be greatly reduced. Because of the adverse effects of high temperature, limits determining the permissible temperature rise have been established for motors subjected to various conditions of use. The temperature rise may be considerably reduced by providing cooling means for the motor, and in this manner a physically small motor may be designed to perform the duty of a much larger motor.

One of the simplest methods of cooling a motor is to direct a stream of air through it, and this has been accompilshed in many instances by the centrifugal effect of the rotating elements of the motor. However, the conditions under which motors are often installed require that some of these motors be enclosed to prevent the admission of water, dirt, and other undesired matter, and such an enclosure has considerably reduced the cooling of the motor itself. Consequently, fan or centrifugal type blowers have sometimes been mounted upon the shaft of the motor to increase the flow of air through the motor while still permitting the enclosure of the latter.

It will be appreciated, however, that the provision of a fan generally increases the physical size of the motor to a certain extent, and hence some of the advantages of using a smaller motor are removed. I have found that by designing a motor in which the fan or blower is considered as an integral part instead of an accessory, I am able to produce a compact and highly efficient motor having improved operating characteristics.

It is therefore a major object of my invention to provide an improved ventilating means for electric motors.

Another object of my invention is to provide a motor of the so-called splash-proof type in which the enclosure preventing the admission of liquid also aids in improving the ventilation of the motor.

It is a further object of my invention to provide a motor having a removable end bell of simple construction that is adapted to cooperate with a fan or blower rotor to provide a highly efficient means of moving air.

Still another object of my invention is to provide such an end bell that operates as an air intake when used alone, and operates as an air outlet and a portion of a blower when used with a rotor.

It is a still further object of my invention to provide an improved fan or rotor for use in conjunction with an electric motor to increase the flow of air therethrough.

These and other objects and advantages of my invention will become apparent from the following description of a preferred form thereof, and from the drawings illustrating that form in which Fig. 1 is a perspective view of an electric motor of the splash-proof type constructed in accordance with my invention;

Fig. 2 is an axial sectional view of the motor shown in Fig. 1;

Fig. 3 is a cross-sectional view of the end bell, taken at 3—3 in Fig. 2;

Fig. 4 is a cross-sectional view of the motor showing the ventilating ducts therethrough, taken at 4—4 in Fig. 2; and Fig. 5 is a perspective view of the blower rotor.

Referring now to the drawings and particularly to Figs. 1 and 2 thereof, the numeral 10 indicates generally a motor having a shell 11 supported by a base 12 and having a pair of end bells 13. As hereinafter described, the end bells 13 are identical, and are attached to the shell 11 to enclose the windings and other portions of the motor, and also to support the motor shaft 14. Under certain conditions, as when a gear reduction is incorporated in the motor 10, the end bells will not be identical, but as hereinafter described, under these conditions at least one of the end bells will be of the type here designated by the numeral 13.

Within the housing formed by the shell 11 and the end bells 13, I provide a plurality of radially extending inwardly projecting lugs 15 having axially extending holes therein to receive bolts 16. A cooperating ring 17 has outwardly projecting lugs 18 that are engaged by the bolts 16 to anchor it to the shell 11, thereby forming an annular space between the ring and the shell, that is divided by the lugs into a plurality of axially extending ducts 20.

On the axially opposite end of the lugs 16 I mount a similar ring 17a, held to the lugs and thus to the shell 11 in the same manner as the ring 17, and between these rings I clamp the magnetic elements 21 of the stator of the motor, which may consist of the stator lamination in the case of the alternating current motor shown, or may include pole-pieces, yoke, and similar members in the case of a direct current motor. Electrical windings 22 of the usual type are mounted on and in the magnetic elements 21, care being taken that a space is provided between the outer circumference of the windings and the housing so that a free and unobstructed passageway for air through the ducts 20 is maintained.

Coaxial with the magnetic elements 21 and the coils or windings 22 is the previously mentioned shaft 14 supported by suitable anti-friction bearings 23 in the end bells 13. A rotor 24 is mounted on the shaft 14 and consists of a magnetic core 25 together with suitable conductors or windings 26. The particular form and construction of the rotor 24 and of the stator, including the magnetic elements 21 and the windings 22, is a matter that is within the discretion of the designer, but it will be seen that the motor 10 may be designed for direct or alternating current operation, and the rotor may be of any suitable design, including the squirrel cage or wound rotor types. In any form of construction, however, the magnetic core 25 is properly aligned with the magnetic elements 21 of the stator, and the general design is in accordance with accepted principles of motor construction. While not essential, I prefer to mount blades or vanes 27 upon the rotor 24, extending axially from the latter toward the air intake of the housing, to aid in producing the proper distribution of air currents.

As best seen in Figs. 1 and 2, the end bells 13 form an appreciable length of the total motor housing since the shell 11 is relatively short, axially, as compared with the axial length of the end bells. The latter are attached to the shell by means of cooperating ears 30 and 31 on the end bells and frame, respectively, and bolts 32 hold the cooperating ears firmly together. Since the ears 30 and 31 are immediately adjacent each other, the bolts 32 may be quite short, and hence there are substantially no tensile stresses induced in the bolts should there be any tendency of the end bells 13 to rotate. Instead, any attempted rotation of the end bells 13 causes only a shearing effect on the bolts 32, and the alignment of the end bells and the shaft 14 is thus maintained with a high degree of accuracy.

The major portion of the end bell 13 is cylindrical to conform and align with the frame 11, but the outer or bearing end of the end bell has its lower half provided with vertically parallel sides 35. The upper half of the end bell is a semi-circular section 36, and the walls and sides are joined together by a vertical end wall 37. The resulting shape of the end bell 13 is shown in Fig. 3, where it will be seen that the bearing 23 is mounted in the end bell concentric with the arc of the upper wall 36. From an inspection of Fig. 2, it will be noted that the end wall 37 of the end bell 13 is thickened near the bearing 23 so that the latter may be mounted flush with the inner surface of the end wall, the radially outward portions of the wall being thinner so that the generally curved shape shown in Fig. 2 is achieved.

Axially inward from the end wall 37 is a partial wall or partition 40 having the same general outline as the end wall 37 but provided with a large centrally located circular aperture 41 therein. The shape of the partial wall 40 is clearly indicated in Fig. 3 where it is shown in phantom outline, and it will be seen that by this construction I have provided a chamber 42 having a shape comparable to the scroll of a conventional centrifugal blower. At the lower end of the chamber 42 I provide a number of vertically extending ribs 43, 44 and 45, the rib 44 being centrally located and radially aligned with the shaft 14, while the ribs 43 and 45 are parallel to the central rib but spaced laterally outward from it. The upper ends of the ribs 43, 44 and 45 are above the lower ends of the vertically extending side walls 35, and hence it is impossible for a horizontally directed stream of liquid to enter directly into the chamber 42. The ribs thus serve as baffles in addition to acting as spacers and separators to support the partial wall 40.

As previously mentioned, the end bells 13 are identical, and one of them acts as an air intake to admit air into the motor housing, while the other has a blower rotor 50 associated with it to act as a centrifugal or turbine-type blower to exhaust air from the housing. As seen in Figs. 2 and 5, the rotor 50 includes a plurality of radially extending blades 51 attached to a hub 52 that in turn is keyed or otherwise firmly connected to the shaft 14. It will be noted that at their inner ends, the blades 51 extend a slight distance axially into the space between the windings 22 and the shaft 14, while at their outer ends, the blades extend substantially to the partial wall 40 and are wholly within the chamber 42. The radially outward, axially inward edges of the blades 51 are connected by a curved member 53 which acts as a shroud to direct the stream of air from the interior of the motor to the chamber 42. In this connection, it will be noted that the shroud 53 and the outer radial edges of the blades 51 extend beyond the inner surface of the stator windings 22, thereby providing a blower of considerable diameter and hence power. Heretofore, the blowers used in electric motors have been of considerably smaller diameter, the diameter of their rotors generally being less than the internal diameter of the windings 22, thereby creating a much smaller flow of air through the motor and providing a greatly reduced cooling capacity.

As the shaft 14 revolves and the rotor 50 turns with it, the air within the rotor will be thrown outwardly by centrifugal force into the chamber 42 where its circular motion will carry it around to the lower portion of the end bell 13. Since this air is slightly compressed, it tends to expand and in so doing, it strikes the rib 45 where it is diverted and discharged downwardly through the opening between the rib 45 and the adjacent side wall 35. Most of the air that is not diverted by the rib 45 continues on around the chamber 42 until it strikes the rib 44 where it is likewise diverted downwardly. This assumes that the rotor 50, not shown in Fig. 3, is rotating in a clockwise direction as seen in that view. Should the rotor 50 be turning in the opposite direction, the principal diversion of the flow of air would be accomplished by the rib 43 instead of the rib 45, while the rib 44 would still accomplish its same purpose.

It will thus be seen that I have provided an improved construction for electric motors which permits a much better ventilation and cooling thereof. In this connection, where a gear reducer is built into the motor so that the power output of the shaft 14 is transmitted through a gear train before being delivered to the driven member, the gear train (not shown) may be located in the end bell 13 which acts as an intake member, and the shape of this end bell will be modified accordingly. Consequently, the efficiency of the blower is not changed, and the same efficient cooling operation results. It will be appreciated that under these conditions the gear train will exert a certain torque upon the end bell, and this torque is transmitted through the short bolts 32 as previously mentioned, placing these bolts in shear instead of inducing appreciable tensile stress in them.

Another features of the construction of my motor is that by providing the external ears 30 and 31, all of the space within the housing of the motor is available for the magnetic and electrical elements thereof, and for the air ducts surrounding these elements. Motors have previously been constructed in which the bolts 32 extend from the end wall 37 of the end bell 13, passing within the housing of the motor to the shell 11. Since these bolts thus occupy space which might otherwise be used for the passage of air, the flow of the latter is materially restricted and a less efficient cooling is secured when this construction is used.

Furthermore, previous motors have been constructed so that the windings 22 of the stator fan out or are enlarged so that the windings likewise interfere with the free flow of air. I have found, however, that by restricting the space occupied by the windings 22, the air passageways may be kept unobstructed without sacrificing any efficiency or other desirable operating characteristics of the motor. This, of course, is done while keeping the physical size of the motor within the dimensions of recognized and accepted standards.

Another factor which contributes to the efficiency of my improved motor is the closeness of fit of the outer radial edges of the blades 51 and shroud 53 with the partial wall or partition 40. This fit is known as a running fit, permitting the free and unhampered rotation of the blower rotor 50, while leaving a minimum of clearance between it and the partition 40 through which air may pass. In this way, substantially all of the air moved by the blades 51 is directed into the chamber 42 from whence it is discharged through the lower end of the end bell 13.

It will be realized that the construction herein described is suitable for direct current or alternating current motors, and either of these types may be provided with commutators and brushes or with slip-rings if such a construction is indicated. Furthermore, because of the similarities in design and construction, my improved means may be used with a motor which converts electrical energy into mechanical energy, as well as in a device converting mechanical energy into electrical energy, normally known as a generator. In each case, the fundamental considerations of efficiently moving air through the housing of the motor remain the same, and it will further be realized that because of the symmetrical construction of the blower 50 and the end bells 13, rotation of the shaft 14 in either direction will produce the same efficient cooling. The design of my improved end bell is such that it may be cast, and this, combined with its versatility as both an air intake and air outlet, means that the cost of a motor incorporating this design may be kept to or below a competitive value.

These and other changes and modifications will be apparent to those skilled in the art and clearly come within the scope of the invention defined herein. Consequently, I do not wish to be restricted to the particular form or arrangement of parts herein described and shown, except as limited by my claims.

I claim:

1. An end bell for an electric motor of the class described which includes: a body portion adapted to align with and be attached to the shell of said motor to form with said shell a housing enclosing said motor; a partial wall attached to said body portion and generally perpendicular to the axis thereof; a projecting wall generally perpendicular to said partial wall and extending beyond the latter, the upper portion of said wall being formed as a continuation of said body portion, with the side portions of said wall being generally parallel to each other and spaced apart; an end wall generally parallel to said partial wall and spaced therefrom to form with said projecting wall a chamber adapted to surround the shaft of said motor at a distance therefrom, said chamber being fluid connected at its center to said housing through said partial wall, and being fluid connected to the outside at the lower portion of its periphery; and ribs generally perpendicular to said partial wall and parallel to said side portions of said projecting wall, extending between said partial wall and said end wall at the lower end of said end bells to act as deflecting vanes and to strengthen said partial wall and said end wall.

2. An electric motor which includes: a shell, a stator having magetic and electrical members; cooperating projections on said shell and said stator to hold the latter to said shell but spaced radially inward therefrom to form a generally axially extending unobstructed air duct between said shell and said stator; identical end bells connected to said shell to form a housing enclosing said stator and continuing the air duct between said stator and said housing, each of said end bells having a body portion adapted to align with and be attached to said shell, a partial wall attached to said body portion and generally perpendicular to the axis thereof, a projecting wall generally perpendicular to said partial wall and extending beyond the latter, the upper portion of said projecting wall being formed as a continuation of said body portion, with the side portions of said projecting wall being generally parallel to each other and spaced apart, an end wall generally parallel to said partial wall and spaced therefrom to form with said projecting wall a chamber that is fluid connected at its center to said housing through said partial wall, and fluid connected to the outside at the lower portion of its periphery, and ribs generally perpendicular to said partial wall and parallel to said side portions of said projecting wall, extending between said partial wall and said end wall at the lower end of said end bell to act as deflecting vanes and to strengthen said partial wall and said end wall; a shaft extending between said end bells and rotatable with respect thereto; a motor rotor carried by said shaft for rotation with respect to said stator and aligned therewith, and a centrifugal blower rotor mounted on said shaft for rotation thereby, adjacent one of said end bells and extending into the chamber thereof to form therewith a centrifugal blower for exhausting air from said housing and discharging it through the open end of said chamber, said blower rotor comprising a hub adapted to be mounted on said shaft for rotation therewith, generally radial blades attached to said hub, each of said blades increasing in its axial dimension as it extends outwardly from said hub until a point intermediate the ends of said blade is reached, said blade thereafter decreasing in its axial dimension as the radially outer end thereof is approached, and an annular shroud attached to and connecting said radial blades, extending from said point intermediate the ends thereof, to said outer radial end, said rotor and its shroud making a "running fit" with said partial wall, the outer diameter of said blower rotor exceeding the inner diameter of said stator.

3. An electric motor which includes: a shell; a stator having magnetic and electrical members supported by said shell but spaced inwardly therefrom; identical end bells connected to said shell to enclose said stator; a shaft rotatably mounted in said end bells; a rotor mounted on said shaft aligned with said stator; a partial wall forming in each of said end bells a chamber; an a centrifugal blower rotor mounted on said shaft for rotation therewith adjacent one of said end bells, said blower rotor including a plurality of generally radially extending blades attached to a hub, said blades extending from a point axially between said partial wall and said motor rotor and radially inward from said stator to a point within said chamber radially outward from the inner portion of said stator, and the axially inward edges of said blades being connected and enclosed by an annular shroud spaced from said shaft and extending radially outward to a point immediately adjacent said partial wall to make a running fit with the latter, one of said chambers coacting with said blower rotor to form a blower drawing air through said motor and exhausting it through said end bell, and the other of said chambers in the other of said end bells acting as an inlet duct to admit air for passage through said motor.

4. An electric motor which includes: a shell; a stator having magnetic and electrical members; cooperating members attached to said shell and said stator to hold the latter to said shell and spaced inwardly therefrom, whereby an unobstructed air passageway is formed between said shell and said stator; end bells connected to said shell to enclose said stator, said end bells each having an end wall and a partial wall spaced from said end wall and said stator to form a chamber between said end wall and said partial wall; a shaft extending between said end bells and rotatable with respect thereto; a rotor mounted on said shaft, aligned with said stator; and a centrifugal blower rotor mounted on said shaft for rotation therewith, adjacent one of said end bells and extending into said chamber to form therewith a centrifugal blower receiving air from the interior of said motor, adjacent the axis of said blower, and discharging said air radially into said chamber and thence, out, the remaining chamber of the remaining end bell acting to receive air from the exterior of said motor and direct it to the interior thereof for passage therethrough, said blower rotor including a plurality of generally radially extending blades attached to a hub, said blades extending from a point axially between said partial wall and said motor rotor and radially inward from said stator to a point within said chamber radially outward from the inner portion of said stator, and the axially inward edges of said blades being connected and enclosed by an annular shroud spaced from said shaft and extending radially outward to a point immediately adjacent said partial wall to make a running fit with the latter.

5. An electric motor which includes: a shell; a stator having magnetic and electrical members; cooperating projections on said shell and said stator to hold the latter to said shell but spaced radially inward therefrom to form a generally axially extending unobstructed air duct between said shell and said stator; identical end bells connected to said shell to form a housing enclosing said stator and continuing the air duct between said stator and said housing, each of said end bells having an end wall, an upper wall, a partial wall parallel to said end wall and spaced therefrom to form a chamber, and side walls between said partial wall and said end wall, whereby said chamber is closed except at its lower end, with an enclosing wall extending from said partial wall to said shell to enclose, with said upper wall, said stator; a shaft extending between said end bells and rotatable with respect thereto; a motor rotor carried by said shaft for rotation with respect to said stator and aligned therewith; and a centrifugal blower rotor mounted on said shaft for rotation thereby, adjacent one of said end bells and extending into the chamber thereof to form therewith a centrifugal blower for exhausting air from said housing and discharging it through the open end of said chamber, said blower rotor including a plurality of generally radially extending blades attached to a hubs, said blades extending from a point axially between said partial wall and said motor rotor and radially inward from said stator to a point within said chamber radially outward from the inner portion of said stator, the axially inward edges of said blades being connected and enclosed by an annular shroud spaced from said shaft and extending radially outward to a point immediately adjacent said partial wall to make a "running fit" with the latter.

VAINO A. HOOVER.

REFERENCES CITED

The following references are of record in the file of this patent:

UNITED STATES PATENTS

| Number | Name | Date |
|---|---|---|
| 1,238,292 | Hellmund | Aug. 28, 1917 |
| 1,275,003 | Eaton | Aug. 6, 1918 |
| 1,751,424 | Rosenthal | Mar. 18, 1930 |
| 1,803,570 | Uggla | May 5, 1931 |
| 1,946,165 | Irwin | Feb. 6, 1934 |
| 1,996,460 | Coates | Apr. 2, 1935 |
| 2,074,067 | Darnell | Mar. 16, 1937 |
| 2,488,365 | Abbott | Nov. 15, 1949 |

FOREIGN PATENTS

| Number | Country | Date |
|---|---|---|
| 139,718 | Great Britain | Mar. 11, 1920 |
| 368,245 | Great Britain | Aug. 29, 1930 |
| 838,564 | France | Dec. 7, 1938 |
| 372,057 | Germany | Mar. 23, 1923 |